United States Patent [19]

Kanemori et al.

[11] Patent Number: 5,335,102

[45] Date of Patent: Aug. 2, 1994

[54] LIQUID CRYSTAL DISPLAY ELEMENT AND METHOD FOR TREATING DEFECTIVE PIXELS THEREIN

[75] Inventors: Yuzuru Kanemori, Tenri; Mikio Katayama, Ikoma; Kiyoshi Nakazawa, Fujidera; Hiroaki Kato, Nara; Kozo Yano, Yamatokoriyama; Naofumi Kondo, Nara; Hiroshi Fujiki, Sakai; Toshiaki Fujihara, Higashiosaka; Hidenori Negoto, Ikoma; Manabu Takahama, Tenri, all of Japan

[73] Assignee: Sharp Kabushiki Kaisha, Osaka, Japan

[21] Appl. No.: 656,845

[22] Filed: Feb. 19, 1991

[30] Foreign Application Priority Data

| May 11, 1990 | [JP] | Japan | 2-121787 |
| May 11, 1990 | [JP] | Japan | 2-121788 |
| May 14, 1990 | [JP] | Japan | 2-125191 |
| Jun. 4, 1990 | [JP] | Japan | 2-146857 |

[51] Int. Cl.$^5$ .......................... G02E 1/343; G09G 2/36
[52] U.S. Cl. ........................................ 359/59; 345/93; 359/87
[58] Field of Search ............ 350/333, 334, 332, 331 R, 350/351; 340/784; 357/23.7; 359/59, 58, 54, 87; 257/72; 345/93

[56] References Cited

U.S. PATENT DOCUMENTS

| 4,368,523 | 1/1983 | Kawate | 350/334 X |
| 4,630,893 | 12/1986 | Credelle et al. | 359/87 |
| 4,666,252 | 5/1987 | Yaniv et al. | 350/333 |
| 4,761,058 | 8/1988 | Okubo et al. | 350/331 T |
| 4,804,953 | 2/1989 | Castleberry | 350/333 X |
| 4,890,097 | 12/1989 | Yamashita et al. | 350/332 X |
| 4,936,656 | 6/1990 | Yamashita et al. | 350/333 |
| 4,955,697 | 9/1990 | Tsukada et al. | 350/332 |
| 5,042,916 | 8/1991 | Ukai et al. | 359/59 |
| 5,062,690 | 11/1991 | Whetten | 359/59 |
| 5,076,666 | 12/1991 | Katayama et al. | 359/59 |
| 5,121,236 | 6/1992 | Ukai et al. | 359/59 |

FOREIGN PATENT DOCUMENTS

| 0372898A2 | 6/1990 | European Pat. Off. |
| 62-245222 | 10/1987 | Japan . |
| 1-048037 | 2/1989 | Japan . |
| 1-048038 | 2/1989 | Japan . |
| 1-144092 | 6/1989 | Japan . |
| 2-055338 | 2/1990 | Japan | 359/59 |
| 2-079026 | 3/1990 | Japan | 359/54 |
| 2-153324 | 6/1990 | Japan . |
| 2-193121 | 7/1990 | Japan | 359/59 |
| 2-254422 | 10/1990 | Japan . |
| 2-254423 | 10/1990 | Japan . |
| 2-294623 | 12/1990 | Japan . |

OTHER PUBLICATIONS

Patent Abstracts of Japan, vol. 8, No. 21, Jan. 28, 1984 and JP-A-58 184 758 (Suwa Seikosha) Oct. 28, 1983.
Patent Abstracts of Japan, vol. 13, No. 475, Oct. 17, 1989 and JP-A-1 186 916 (Matsushita) Jul. 26, 1989.

Primary Examiner—William L. Sikes
Assistant Examiner—Ron Trice
Attorney, Agent, or Firm—Nixon & Vanderhye

[57] ABSTRACT

An active matrix display device comprising: scanning branch lines each branching from the scanning line; and switching elements each formed on an end portion of the scanning branch line, wherein the distance between the scanning line side of the switching element and the scanning line is so provided as to enable the scanning branch line to be cut off by irradiation with light energy. Alternatively, an active matrix display device comprising: a conductive layer disposed under the signal line and the pixel electrode with an insulating film interposed therebetween; and a conductive piece formed between the pixel electrode and the insulating film.

8 Claims, 14 Drawing Sheets

Fig. 1
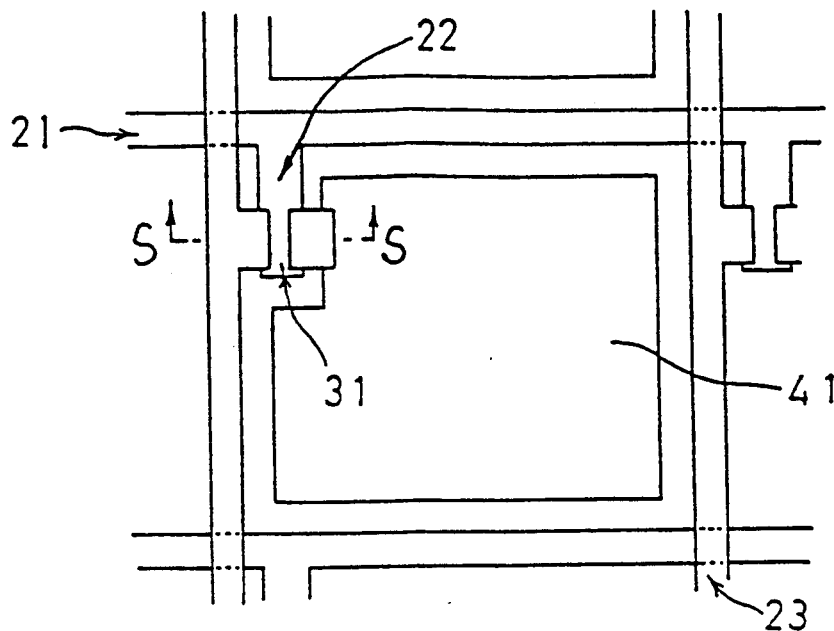
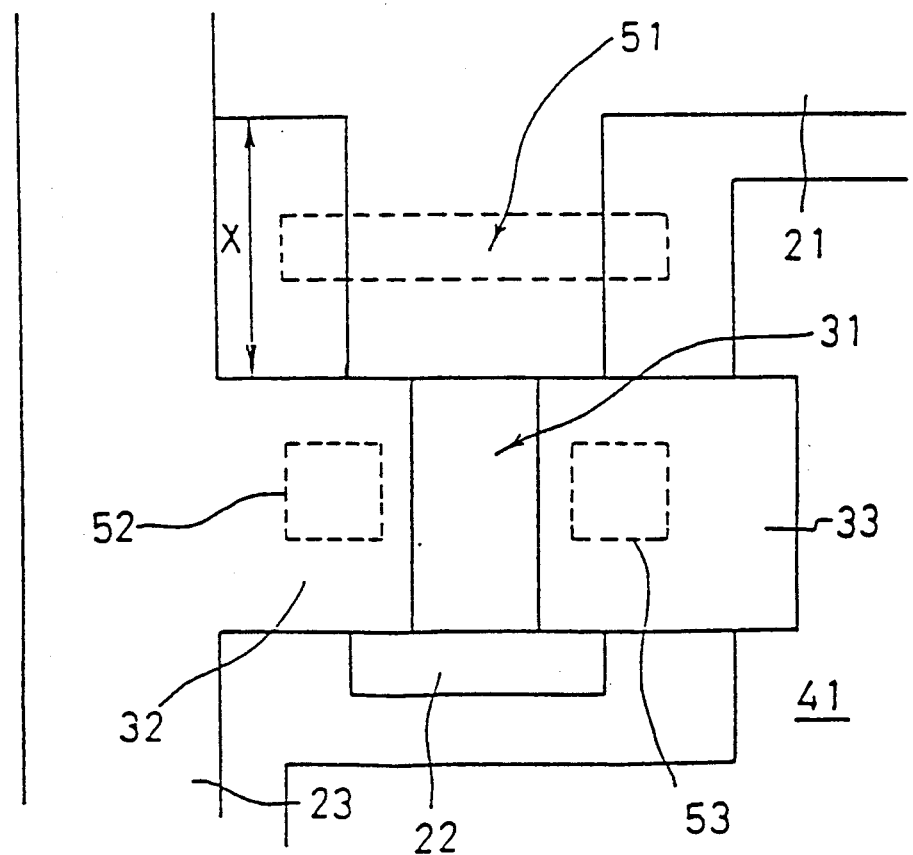
Fig. 2

Fig. 6
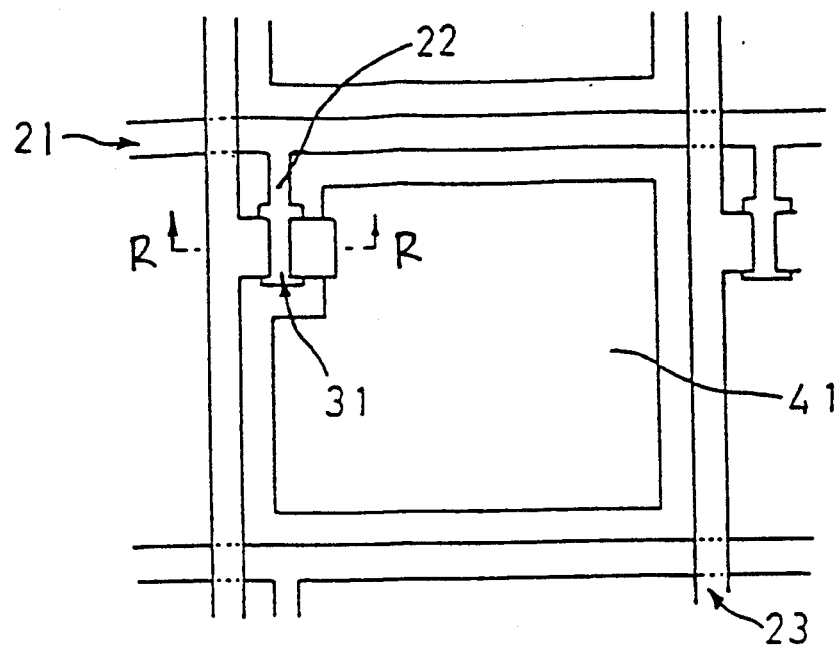
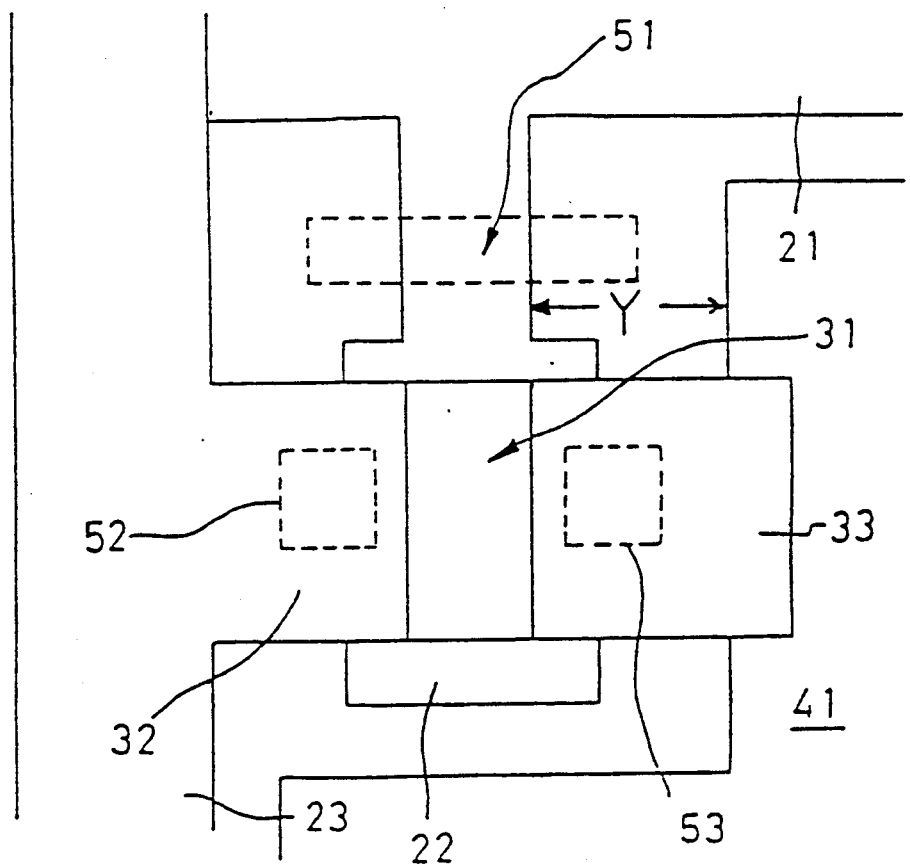
Fig. 7

LIQUID CRYSTAL DISPLAY ELEMENT AND METHOD FOR TREATING DEFECTIVE PIXELS THEREIN

BACKGROUND OF THE INVENTION

1. Field of the Invention:

The present invention relates to a display device which performs its display function by applying driving signals to pixel electrodes via switching elements, and more particularly to an active matrix driving type display device which performs high-density display by using pixel electrodes arranged in a matrix pattern.

2. Description of the Prior Art:

In liquid crystal display devices, EL display devices, plasma display devices and the like, it is known how to produce a display pattern on a screen by selectively driving pixel electrodes arranged in a matrix pattern. In such display devices, voltage is applied between each selected pixel electrode and a counter electrode disposed facing it, to optically modulate a display medium such as liquid crystal or the like interposed between these electrodes. This optical modulation is recognized as a display pattern. As a method for driving pixel electrodes, an active matrix driving method is known in which independent pixel electrodes are arrayed and are driven via switching elements connected to the respective pixel electrodes. As the switching elements used to selectively drive the pixel electrodes, TFT (thin film transistor) elements, MIM (metal-insulator-metal) elements, MOS transistors, diodes, varistors, etc. are generally known. Because the active matrix driving method is capable of performing high contrast display, it has been put to practical use in liquid crystal televisions, word processors, computer terminal displays and the like.

FIGS. 21 and 22 are plan views of active matrix substrates used in active matrix display devices according to a prior art. On the substrate shown in FIG. 21, source bus lines 23 are disposed in parallel and intersecting at right angles with gate bus lines 21 which are arranged parallel with each other. A pixel electrode 41 is disposed in each rectangular area surrounded by two gate bus lines 21 and two source bus lines 23. On each gate bus line 21 and adjacent to the intersection of the gate bus line 21 and the source bus line 23, there is formed a TFT 31 which functions as a switching element, a portion of the gate bus line 21 functioning as the gate electrode of the TFT 31. The drain electrode of the TFT 31 is electrically connected to the pixel electrode 41, while a branch line branching from the source bus line 23 is connected to the source electrode of the TFT 31.

The active matrix substrate of FIG. 22 is the same as that of FIG. 21 except that the construction around the TFT 31 is different. In FIG. 22, the TFT 31 is formed on a gate bus branch line 22 branching from the gate bus line 21, a portion of the gate bus branch line 22 functioning as the gate electrode of the TFT 31.

To achieve high-density display using such display devices, it is necessary to array a great number of pixel electrodes 41 and TFTs 31. However, there may be cases in which some TFTs 31 have been already formed as defective TFTs when they are formed on a substrate. The pixel electrodes connected to such a defective TFT cause defective pixel elements that do not contribute to the display. Such defective pixel elements result in substantial damage to the image quality of the display device, and therefore, greatly reduces the product yield. Display devices having constructions to correct the defective TFTs are disclosed in Japanese Laid-Open Patent Publications Nos. 2-153324, 2-294623 and 2-254423. These display devices comprise spare TFTs which are connected to a pixel element electrode connected to the defective TFT.

There are two major causes for the defective pixel elements. One is the failure to sufficiently charge the pixel electrode during the period in which the pixel electrode is selected by a scanning signal (hereinafter referred to as the "on-failure"). The other is a failure that causes the charge in the charged pixel electrode to leak during the period in which the pixel electrode is not selected (hereinafter referred to as the "off-failure"). The on-failure is attributable to a defective TFT. The off-failure is caused either by electrical leakage via the TFT or by electrical leakage between the pixel electrode and the bus line. In either causes of failure, since necessary voltage is not applied between the pixel electrode and the counter electrode, a defective pixel element is produced. When such failures occur, the defective pixel element appears as a bright spot in the normally white mode in which light transmittance is the highest when the voltage applied between the pixel electrode and the counter electrode is 0 V, and as a black spot in the normally black mode in which light transmittance is the lowest when the voltage is 0 V.

Such a defective pixel element can be corrected by performing laser trimming, etc. However, correction of the defective pixel element must be done on an active matrix substrate before the substrate is assembled into a display device. It is easy to detect pixel defects after the display device has been assembled, but it is extremely difficult to detect pixel defects in an active matrix substrate before assembly, particularly in the case of a large-size display device having 100,000 to 500,000 pixels. Even if the detection and the correction of the defective pixel electrode can be achieved, it requires a high precision measuring instrument as disclosed in Japanese Laid-Open Patent Publication No. 1-144092. It involves a complicated inspection process and is detrimental to mass production efficiency to examine the electrical characteristics of all pixel electrodes and detect the defective TFTs. It therefore causes an increase in costs. For these reasons, as the situation stands now, it is not possible to correct defective pixels in an active matrix substrate before being assembled by the above-mentioned method using a laser beam in the case of large-size display devices having a great number of pixels.

SUMMARY OF THE INVENTION

The active matrix device of this invention, which overcomes the above-discussed and numerous other disadvantages and deficiencies of the prior art, comprises a pair of insulating substrates at least one of which is light transmitting; scanning lines arranged on one of said pair of substrates; scanning branch lines each branching from said scanning line; and switching elements each formed on an end portion of said scanning branch line, wherein the distance between the scanning line side of said switching element and said scanning line is so provided as to enable said scanning branch line to be cut off by irradiation with light energy.

In a preferred embodiment, the active matrix display device further comprises a pixel electrode connected to said switching element and a supplemental capacitor electrode disposed opposite to said pixel electrode with an insulating film interposed therebetween, a supplemental capacitor being formed between said pixel electrode and said supplemental capacitor electrode.

In a preferred embodiment, the active matrix display device further comprises a pixel electrode connected to said switching element and disposed opposite to a scanning line adjacent to said scanning line with an insulating film interposed therebetween, a supplemental capacitor being formed at the superimposing portion of said pixel electrode and said adjacent scanning line.

Alternatively, the active matrix display device of this invention comprises: a pair of insulating substrates at least one of which is light transmitting; scanning lines arranged on one of said pair of substrates; scanning branch lines each branching from said scanning line; and switching elements each formed on an end portion of said scanning branch line, wherein a portion of said scanning branch line other than the portion thereof where said switching element is formed is narrower than that of the portion thereof where said switching element is formed.

In a preferred embodiment, said narrower width portion is formed by cutting one or the other side of a portion of said scanning branch line other than the portion thereof where said switching element is formed.

In a preferred embodiment, the active matrix display device further comprises a pixel electrode connected to said switching element and a supplemental capacitor electrode disposed opposite to said pixel electrode with an insulating film interposed therebetween, a supplemental capacitor being formed between said pixel electrode and said supplemental capacitor electrode.

In a preferred embodiment, the active matrix display device further comprises a pixel electrode connected to said switching element and disposed opposite to a scanning line adjacent to said scanning line with an insulating film interposed therebetween, a supplemental capacitor being formed at the superimposed portion of said pixel electrode and said adjacent scanning line.

The method of manufacturing an active matrix display device of this invention comprises the steps of: forming an active matrix substrate which comprises an insulating substrate, scanning lines and signal lines arranged in vertical and horizontal directions on said substrate, scanning branch lines each branching from said scanning line, switching elements each formed on an end portion of said scanning branch line, and pixel electrodes each connected to said switching element, the distance between the scanning line side of said switching element and said scanning line being so provided as to allow said scanning branch line to be cut off by irradiation with light energy; attaching an opposing substrate to said active matrix substrate with a display medium sandwiched between said active matrix substrate and said opposing substrate; detecting a pixel defect by applying a driving voltage to said pixel electrodes from said scanning lines and said signal lines via said switching elements; and irradiating light energy onto the switching element connected to a defective pixel electrode causing said pixel defect to electrically connect said defective pixel electrode to said signal line, and irradiating light energy onto said scanning branch line to disconnect said scanning branch line from said scanning line.

Alternatively, the active matrix display device comprises a pair of insulating substrates at least one of which is light transmitting; scanning lines and signal lines arranged in vertical and horizontal directions on one of said pair of substrates; and pixel electrodes each connected to said scanning line and said signal line via a switching element. The active matrix display device further comprises a conductive layer disposed under said signal line and said pixel electrode with an insulating film interposed therebetween; and a conductive piece formed between said pixel electrode and said insulating film.

Alternatively, the active matrix display device comprises: a pair of insulating substrates at least one of which is light transmitting; scanning lines and signal lines arranged in vertical and horizontal directions on one of said pair of substrates; and pixel electrodes each connected to said scanning line and said signal line via a switching element. The active matrix display device further comprises a conductive layer disposed under said signal line and a pair of adjacent pixel electrodes with an insulating film interposed therebetween; and conductive pieces each formed between said insulating film and one of said pair of pixel electrodes.

In a preferred embodiment, said conductive layer is electrically connected to a scanning line adjacent to said scanning line connected to said pixel electrode with an anodic oxide film formed on said conductive layer.

In a preferred embodiment, the active matrix display device further comprises a supplemental capacitor electrode disposed opposite to said pixel electrode with said insulating film interposed therebetween, wherein said conductive layer is electrically connected to said supplemental capacitor electrode, and an anodic oxide film is formed on said conductive layer.

The method of manufacturing an active matrix display device of this invention comprises the steps of: forming an active matrix substrate which comprises an insulating substrate, scanning lines and signal lines arranged in vertical and horizontal directions on said substrate, pixel electrodes each connected to said scanning line and said signal line via a switching element, conductive layers each disposed under said signal line and said pixel electrode with an insulating film interposed therebetween, and conductive pieces each formed between said pixel electrode and said insulating film; attaching an opposing substrate to said active matrix substrate with a display medium sandwiched between said active matrix substrate and said opposing substrate; detecting a pixel electrode by applying a driving voltage to said pixel electrodes from said scanning lines and said signal lines via said switching elements; and irradiating light energy onto the superimposed portion of said conductive layer and said conductive piece connected to a defective pixel electrode causing said pixel defect to electrically connect said defective pixel electrode to said conductive layer, and irradiating light energy onto the superimposed portion of said signal line and said conductive layer to electrically connect said signal line to said conductive layer.

In the active matrix display device of the present invention, when an on-failure or off-failure occurs because of a defective switching element, occurrence of a weak leakage current between a signal line and a pixel electrode, or the other reasons, the defective pixel can be corrected in an assembled display device. First, the scanning branch line concerned is cut off by irradiating a laser beam. In the display device of the present invention, the distance between the scanning line side of a switching element and the scanning line is so provided as to allow the scanning branch line to be cut off by irradiation of light energy such as a laser beam or the like. Also, in another embodiment of the present invention, the scanning branch line is provided with a portion having a reduced width so as to facilitate the cutting thereof by laser beam irradiation. Therefore, in the display device of the present invention, the scanning branch line can be reliably cut off.

Next, light energy is irradiated to electrically interconnect the electrode of the switching element connected to the pixel electrode and the electrode thereof connected to the signal line. When the switching element is a TFT, the electrical interconnection is made by irradiating light energy onto the superimposed portion of the source electrode and the gate electrode and also onto the superimposed portion of the drain electrode and the gate electrode. When a laser beam is used as the light energy, a spot-like hole is made in each of the superimposed portions. Around these holes, the source electrode is electrically connected to the gate electrode and the drain electrode is electrically connected to the gate electrode. Thus, the source electrode and the drain electrode are electrically interconnected via the gate electrode.

In an active matrix display device having the conductive layer and the conductive piece of the present invention, when an on-failure or off-failure occurs because of a defective switching element, occurrence of a weak leakage current between a signal line and a pixel electrode, or the other reasons, the defect can be corrected in an assembled display device. First, light energy is irradiated onto the superimposed portion of the signal line and the conductive layer to electrically interconnect the signal line and the conductive layer. Next, light energy is projected onto the superimposed portion of the conductive layer and the conductive piece to electrically interconnect the conductive layer and the conductive piece. Thus, the signal line and the pixel electrode are directly interconnected electrically without interposition of the switching element. Further, in the construction in which the conductive layer is electrically connected to the scanning line or to the supplemental capacitor electrode, the electrical connection between the conductive layer and the scanning line or the supplemental capacitor electrode is cut by irradiating light energy.

Referring now to FIG. 20, it will be explained how the voltage is applied to the pixel electrode which has been directly connected to the signal line in the above manner (hereinafter referred to as the "corrected pixel electrode"). In FIG. 20, $G_n$ represents the relationship of the signal voltage (plotted along the ordinate) on the n-th scanning line with respect to the time (plotted along the abscissa) while $S_m$ illustrates the relationship of the signal voltage (plotted along the ordinate) on the m-th signal line with respect to the time (plotted along the abscissa). $P_{n,m}$ indicates the voltage applied to a normal pixel electrode connected to the n-th scanning line and the m-th signal line. $P'_{n,m}$ indicates the voltage applied to a corrected pixel electrode connected to the n-th scanning line and the m-th signal line.

As shown in $G_n$ and $G_{n+1}$, a signal ($V_{gh}$) for sequentially selecting the switching elements is output on the scanning line during a selection time $T_{on}$. Corresponding to the selection time $T_{on}$ on the scanning line, a video signal voltage $V_0$ is output on the signal line, and in the case of a normal pixel electrode, the video signal voltage $V_0$ is held during a non-selection time $T_{off}$ as shown in $P_{n,m}$. Then, when the next selection signal voltage $V_{gh}$ is applied, a video signal $-V_0$ is applied to the signal line.

On the other hand, in the case of a corrected pixel electrode, since the video signal from the signal line is applied all the time as shown in $P'_{n,m}$, the corrected pixel electrode is unable to function properly. However, when the entire cycle is viewed, the pixel driven by the corrected pixel electrode produces a display corresponding to the root-mean-square value of the video signal applied to the signal line during that one cycle. Therefore, the pixel does not appear as a complete bright spot or black spot but produces a display having the average brightness of the pixels arrayed along the signal line. Thus, the defect of the pixel is made extremely difficult to discern.

It is required that the connections made in the above manner have an electrical resistance lower than the resistance of the switching element in a selected condition (hereinafter referred to as the "on-state resistance"). The reason is believed to be as follows: The on-state resistance of the switching element is determined so that a current enough to charge the pixel electrode flows during the time in which the switching element is selected. Therefore, if the resistance at the above connection is higher than the on-state resistance, the signal voltage varying at every selection time of the switching element will not be completely written in the corrected pixel electrode, reducing the root-mean-square value of the voltage applied to the corrected pixel electrode. In such a condition, the difference in brightness increases between the pixel driven by the corrected pixel electrode and the normally operating pixels, so that the pixel defect becomes visually discernible.

Thus, it is an object of the present invention to provide an active matrix display device in which any pixel defect can be corrected to an undiscernible level within the assembled display device itself. It is another object of the present invention to provide a method of manufacturing an active matrix display device in which any pixel defect can be corrected to an undiscernible level in an assembled display device.

In the active matrix display device of the present invention, any pixel defect can be corrected to an undiscernible level with the display device in an assembled condition under which the pixel defect is easy to detect. Therefore, according to the present invention, the display device can be manufactured at a high yield ratio, thus contributing to a reduction of the cost of the display device.

BRIEF DESCRIPTION OF THE DRAWINGS

This invention may be better understood and its numerous objects and advantages will become apparent to those skilled in the art by reference to the accompanying drawings as follows:

FIG. 1 is a plan view of an active matrix substrate used in an active matrix display device of the present invention.

FIG. 2 is an enlarged plan view of a TFT and its adjacent portions as shown in FIG. 1.

FIG. 6 is a plan view showing an embodiment with a gate bus branch line having a reduced width portion.

FIG. 7 is an enlarged plan view of the TFT and its adjacent portions shown in FIG. 6.

DESCRIPTION OF THE PREFERRED EMBODIMENTS

Figure 3:
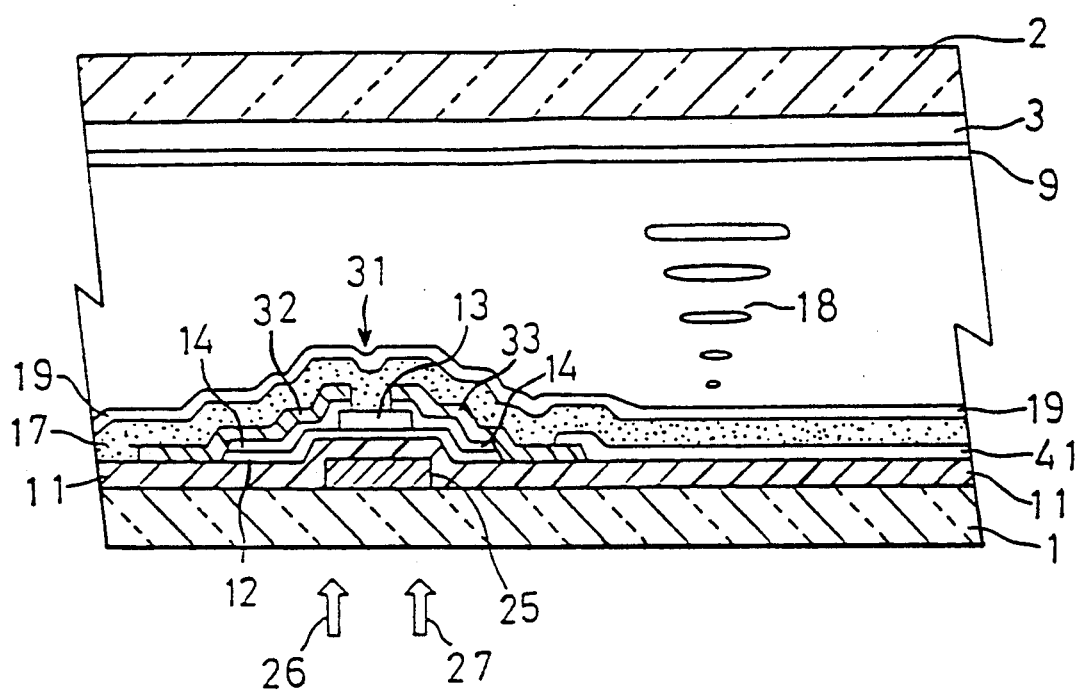
FIG. 3 is a cross sectional view of a display device using the substrate of FIG. 1, taken along line S—S in FIG. 1.

FIG. 1 shows a plan view of an active matrix substrate used in one embodiment of the display device of the present invention. FIG. 3 shows a cross sectional view of a display device using the substrate of FIG. 1, taken along line S—S in FIG. 1. The following describes the active matrix display device of this embodiment in the sequence of its manufacturing steps. In this embodiment, a transparent glass substrate is used as the insulating substrate. There are formed on the glass substrate 1 a gate bus line 21 which functions as a scanning line and a gate bus branch line 22 which branches from the gate bus line 21. Generally, the gate bus line 21 and the gate bus branch line 22 are formed from a single or multiple layer of such metals as Ta, Ti, Al, Cr, etc. In this embodiment, Ta is used as the material. The gate bus line 21 and the gate bus branch line 22 are formed by patterning the Ta metal layer deposited by using a sputtering method. A base coat film formed from $Ta_2O_5$, etc. may be formed on the glass substrate 1 prior to the formation of the gate bus line 21 and the gate bus branch line 22. The length of the gate bus branch line will be described later.

A base insulating film 11 made of $SiN_x$ is formed all over the surface covering the gate bus line 21 and the gate bus branch line 22. The gate insulating film 11 is deposited to a thickness of 3000 Å using the plasma CVD technique.

Next, a TFT 31 which functions as a switching element is formed at an end portion of the gate bus branch line 22. A portion of the gate bus branch line 22 functions as the gate electrode 25 of the TFT 31. After forming the gate insulating film 11 as described above, an amorphous silicon (a-Si) layer which is later formed as a channel layer 12 and an $SiN_x$ layer which is later formed as an etching stopper layer 13 are deposited. The thickness of the a-Si layer is 300 Å, and that of the $SiN_x$ layer is 2000 Å. Next, the $SiN_x$ layer is patterned to form the etching stopper layer 13. Furthermore, over the entire surfaces of the a-Si layer and the etching stopper layer 13, an n+-a-Si layer doped with P (phosphorus) which is later formed as contact layers 14 and 14 is deposited to a thickness of 800 Å using the plasma CVD technique. After that, the a-Si layer and the n+-a-Si layer are simultaneously patterned to form the channel layer 12 and the contact layers 14 and 14.

Next, a Ti metal layer is formed which is later formed as a source electrode 32, a source bus line 23 to function as a signal line, and a drain electrode 33. Generally, the source bus line 23 and others are formed from a single or multiple layers of such metals as Ti, Al, Mo, Cr, etc. In this embodiment, Ti is used as the material. The Ti metal layer is deposited by sputtering. The Ti metal layer is patterned to form the source electrode 32, the source bus line 23, and the drain electrode 33. The source bus line 23 and the gate bus line 21 intersect each other with the gate insulating film 11 interposed therebetween.

Next, a pixel electrode 41 made of ITO (indium tin oxide) is formed in a rectangular area surrounded by the gate bus line 21 and the source bus line 23, as shown in FIG. 1. The pixel electrode 41 is superimposed on an end portion of the drain electrode 33 of the TFT 31 for electrical connection to the drain electrode 33.

Further, over the entire surface of the substrate on which the TFT 31 and the pixel electrode 41 are formed, a protective film 17 made of $SiN_x$ is deposited. The protective film 17 may be formed in the shape of a window opened above the central portion of the pixel electrode 41. An orientation film 19 is formed over the protective film 17. On a glass substrate 2 disposed opposite to the glass substrate 1, there are formed a counter electrode 3 and an orientation film 9. A liquid crystal layer 18 is sandwiched between the substrates 1 and 2 to complete the active matrix display device of the present invention.

Figure 22:
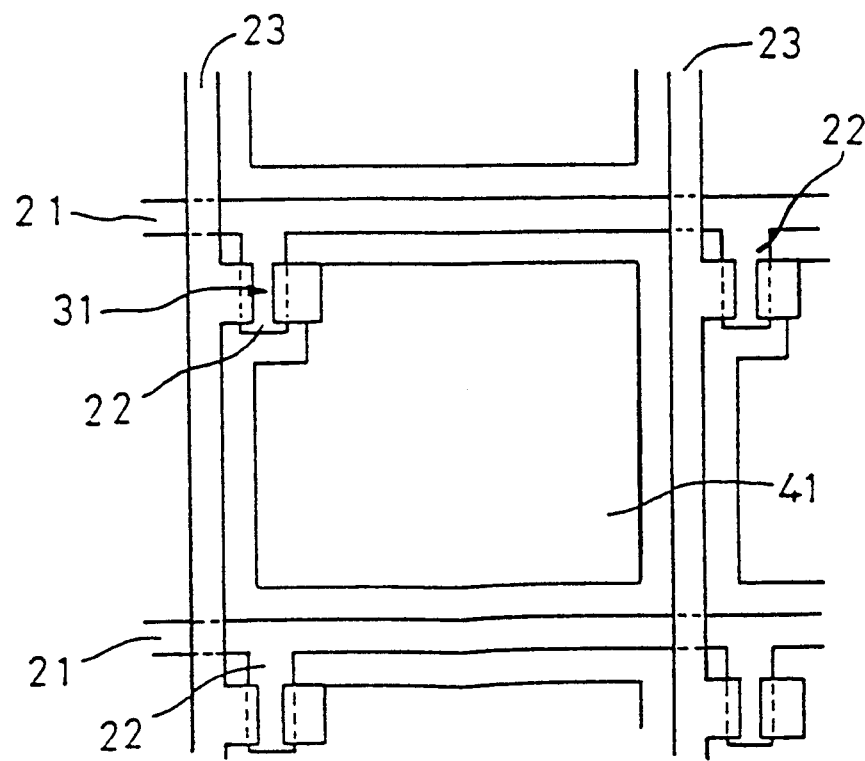

The construction around the TFT 31 will now be explained. FIG. 2 shows an enlarged view of the TFT 31 and its adjacent portions. As previously described, the TFT 31 is formed on the gate bus branch line 22 branching from the gate bus line 21. The drain electrode 33 of the TFT 31 is electrically connected to the pixel electrode 41 while the source electrode 32 thereof is electrically connected to the source bus line 23. The distance X between the side of the TFT 31 nearer to the gate bus line 21 and the gate bus line 21 is greater than that in the prior art previously described in connection with FIG. 22, so as to allow the gate bus branch line 22 to be cut off using light energy such as a laser beam or the like. It has been confirmed that the line can be cut off reliably if the distance X is 10 μm or more. If the distance X is smaller than 10 μm, it not only makes it impossible to cut off the gate bus branch line 22 without damaging the TFT 31 but also gives rise to a possibility that the irradiation by a laser beam may adversely affect the intersection of the gate bus line 21 and the source bus line 23 and may cause insulation failure between the bus lines 21 and 23.

In the active matrix display device of the above construction, when the TFT 31 becomes defective or when a weak leakage current flows between the source bus line 23 and the pixel electrode 41, a pixel defect occurs. If this happens, correction is made in the following manner. First, light energy is irradiated onto an area 51 indicated by a broken line in FIG. 2 to cut off the gate bus branch line 22. The gate bus branch line 22 is thus electrically isolated from the gate bus line 21. In this embodiment, a YAG laser beam is used as the light energy. As described, since the distance X is sufficiently large, the gate bus branch line 22 can be cut off reliably. The laser beam may be irradiated either through the substrate 1 or through the substrate 2. When a light shield film is formed on the substrate 2, which is often the case, the laser beam is irradiated through the substrate 1. In this embodiment also, the laser beam is irradiated through the substrate 1. Next, the laser beam is irradiated onto areas 52 and 53 indicated by broken lines in FIG. 2, that is, onto the portions indicated by arrows 26 and 27 in FIG. 3. As a result, the source electrode 32 and the gate electrode 25 are electrically interconnected at the area 52, while at the area 53 the drain electrode 33 and the gate electrode 25 are electrically interconnected. Thus, the source electrode 32 and the drain electrode 33 are electrically interconnected via the gate electrode 25.

Since the signal from the source bus line 23 is applied at all times to the pixel electrode 41 (corrected pixel electrode) connected to the TFT 31 corrected in the above manner, the corrected pixel electrode is unable to function properly. However, since the pixel driven by the corrected pixel electrode performs a display corresponding to the root-mean-square value of the signal applied to the source bus line 23, the pixel does not appear as a complete bright spot or black spot but performs display having the average brightness of the pixels arrayed along the source bus line 23. Thus, the defect of the pixel is made extremely difficult to discern.

Even if the laser beam irradiates as described above, since the protective film 17 is formed over the gate bus branch line 22 and the TFT 31, molten metals or other foreign matter are prevented from entering the display medium, i.e. the liquid crystal layer 18, and therefore, no detrimental effects are caused to the display. Also, it has been found that by changing the irradiating conditions of the laser beam, the same laser beam can be used for melting and interconnecting the metal layers as well as for cutting the metal layers.

Also, in the above correction work, interconnections between the gate electrode 25, source electrode 32, and drain electrode 33 of the TFT 31 may be made prior to the cutting of the gate bus branch line 22.

Figure 4:
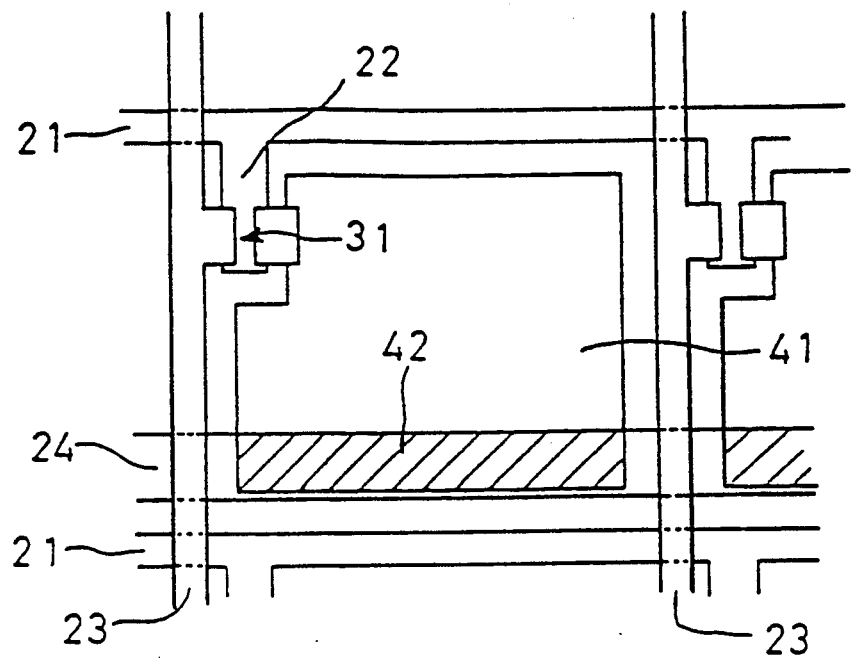
FIGS. 4 and 5 are plan views of other embodiments each having a supplemental capacitor.

The construction of the present invention may also be applied to an active matrix display device having a supplemental capacitor 42 as shown in FIG. 4. The display device of FIG. 4 is identical to the foregoing embodiment illustrated in FIGS. 1 to 3, except that the supplemental capacitor 42 is provided. The supplemental capacitor 42 is formed on the superimposed portion (shaded portion) of the pixel electrode 41 and a supplemental capacitor electrode 24 disposed on the substrate 1 in parallel with the gate bus line 21. In the display device of FIG. 4 also, pixel defects can be corrected in the same manner as in the foregoing embodiment illustrated in FIGS. 1 to 3.

Figure 5:
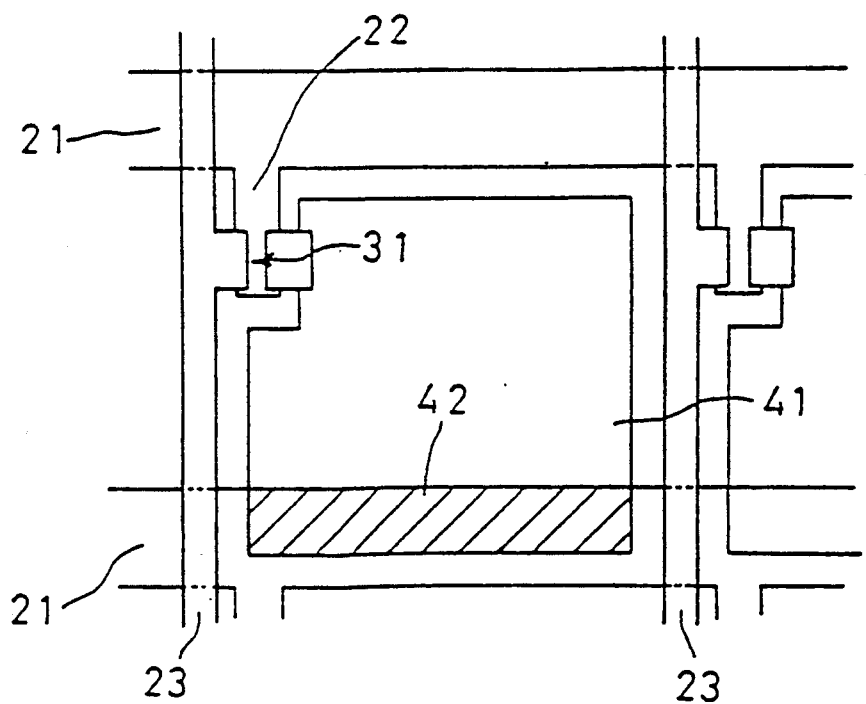

Furthermore, the present invention can be applied to an active matrix display device having a construction like that shown in FIG. 5. The display device shown is so constructed as to prevent the opening area from being reduced by the provision of the supplemental capacitor 42 which is the case with the display device of FIG. 4. That is, in the display device of FIG. 5, the gate bus line 21 is enlarged in width so as to be superimposed on a portion of the pixel electrode 41. According to this construction, the adjacent gate bus line 21 which is in a non-selected condition can be used as the supplemental capacitor electrode. Further, since no gap is created between the gate bus line 21 and the supplemental capacitor electrode 24 unlike the construction of FIG. 4, the opening area is prevented from being reduced. In this display device also, pixel defects can be corrected in the same manner as in the foregoing embodiment illustrated in FIGS. 1 to 3.

FIG. 6 shows a plan view of an active matrix substrate used in another embodiment of the display device of the present invention. This embodiment has the same construction as that of the embodiment illustrated in FIG. 1, except that the shape of the gate bus branch line 22 is different when viewed from the top. The cross sectional view of a display device using the substrate of FIG. 6, taken along line R—R in FIG. 6, is the same as shown in FIG. 3 previously described. Referring to FIG. 7, the construction around the TFT 31 of this embodiment will be now explained. As previously described, the TFT 31 is formed on the gate bus branch line 22 branching from the gate bus line 21. The drain electrode 33 of the TFT 31 is electrically connected to the pixel electrode 41 while the source electrode 32 thereof is electrically connected to the source bus line 23. A portion of the gate bus branch line 22 other than the portion thereof where the TFT 31 is formed has a width narrower than that of the portion thereof where the TFT 31 is formed. By providing such a narrower width portion, it is possible to make the distance Y between the pixel electrode 41 and the gate bus branch line 22 larger than that in the prior art previously illustrated with reference to FIG. 22. The provision of a sufficiently long distance Y allows the gate bus branch line 22 to be cut off more easily and reliably using light energy such as a laser beam or the like. It has been confirmed that the line can be cut off reliably if the distance Y is 10 $\mu$m or more. If the distance Y is smaller than 10 $\mu$m, it not only makes it impossible to cut off the gate bus branch line 22 without damaging the TFT 31 but also gives rise to a possibility that the irradiation by laser beam may adversely affect the intersection of the gate bus line 21 and the source bus line 23 and may cause insulation failure between the bus lines 21 and 23.

In the active matrix display device of the above construction, when the TFT 31 becomes defective or when a weak leakage current flows between the source bus line 23 and the pixel electrode 41, a pixel defect occurs. If this happens, the defect is corrected in the same manner as in the foregoing embodiment illustrated in FIG. 1. First, light energy is irradiated onto an area 51 indicated by a broken line in FIG. 7, to cut off the gate bus branch line 22. As a result, the gate bus branch line 22 is electrically isolated from the gate bus line 21. As previously described, since the gate bus branch line 22 has a portion where the width is narrower than the portion thereof on which the TFT 31 is formed, the gate bus branch line 22 can be cut off easily and reliably. Next, the laser beam is irradiated onto areas 52 and 53 indicated by broken lines in FIG. 7. As a result, the source electrode 32 and the drain electrode 33 are electrically interconnected via the gate electrode 25.

The signal from the source bus line 23 is applied at all times to the pixel electrode 41 (corrected pixel electrode) connected to the TFT 31 corrected in the above manner. Therefore, the pixel defect is made extremely difficult to discern.

Figure 8A:
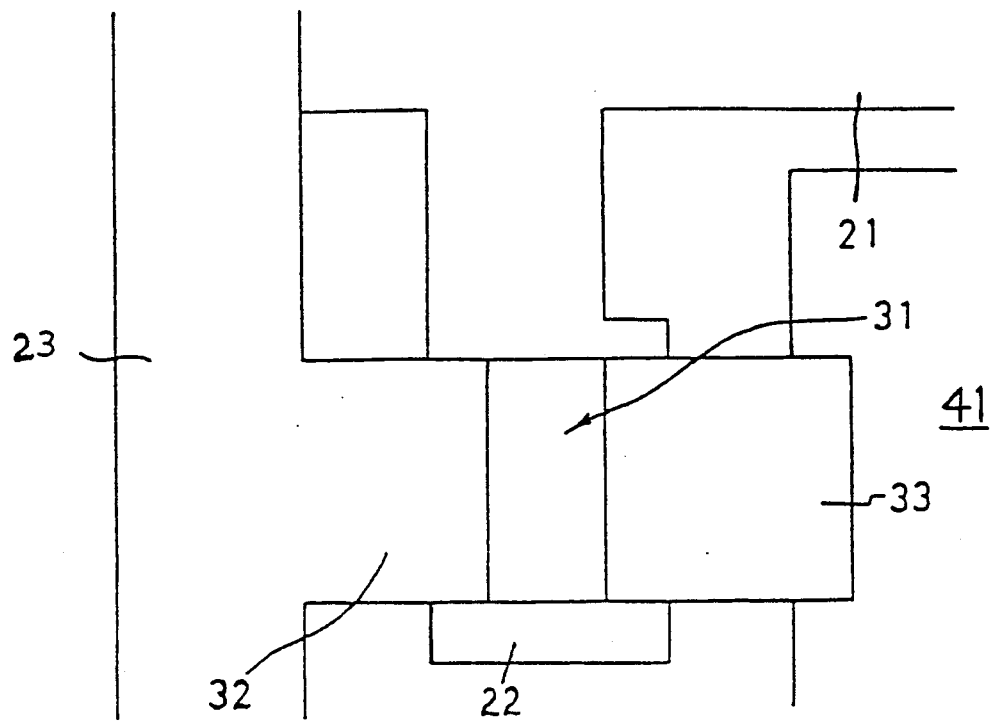
FIG. 8A and FIG. 8B are plan views of gate bus branch lines in other embodiments of the present invention.
Figure 8B:
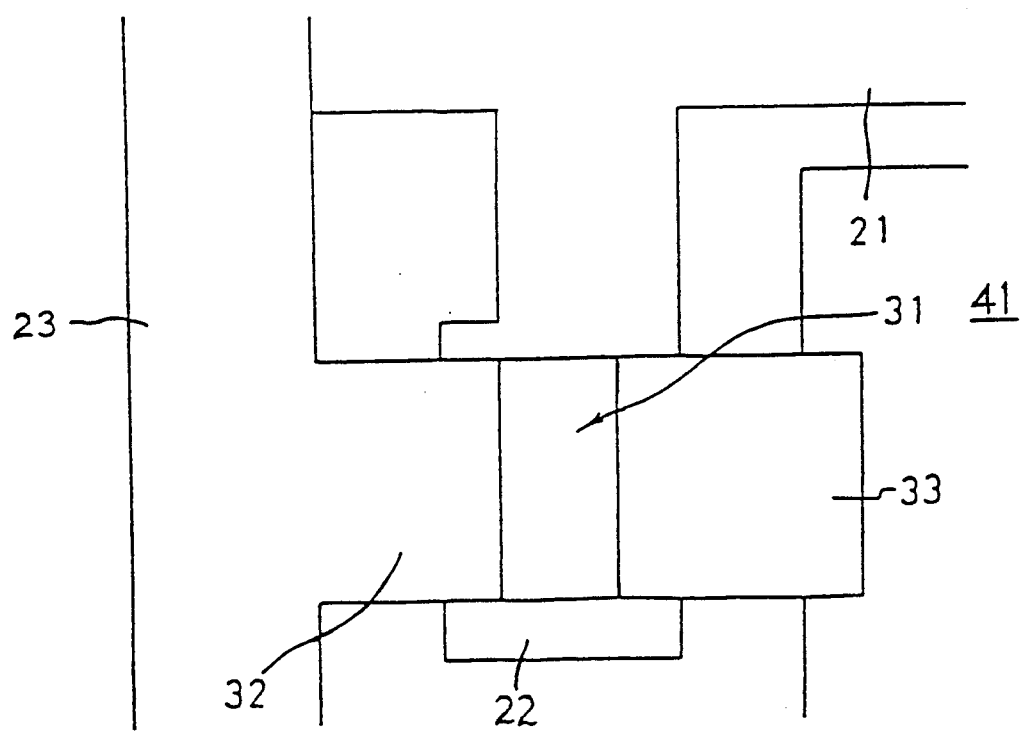
Figure 21:
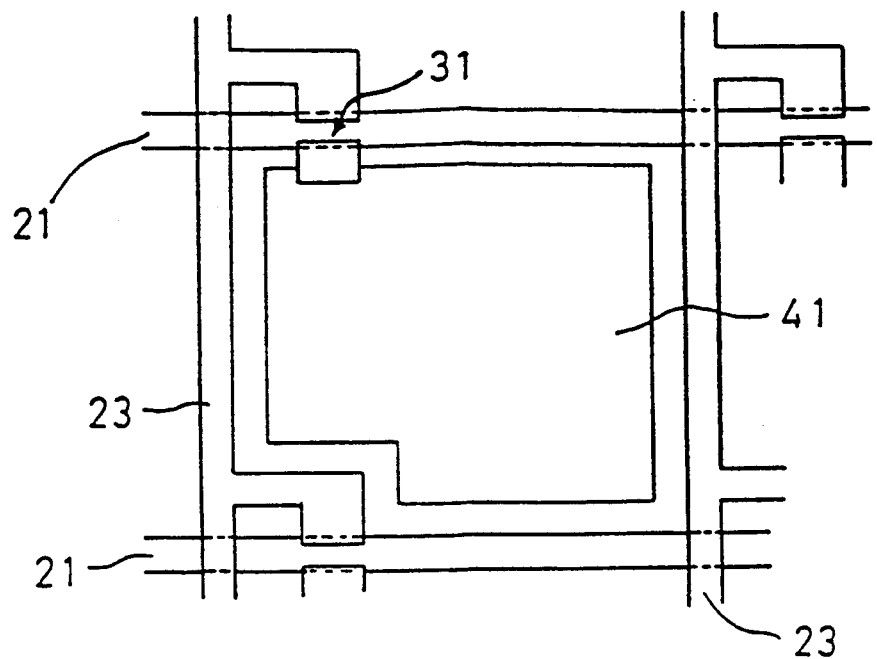
FIGS. 21 and 22 respectively are plan views of active matrix substrates used in prior art active matrix display devices.

The gate bus branch line 22, when viewed from the top, may be formed as shown in FIG. 8A or FIG. 8B. In the gate bus branch line 22 shown in FIG. 8A, the portion having a reduced width is formed by removing a portion from the pixel electrode 41 side of the gate bus branch line 22 shown in FIG. 4. Likewise, in the gate bus branch line 22 shown in FIG. 8B, the portion having a reduced width is formed by removing a portion from the source bus line 23 side of the gate bus branch line shown in FIG. 21.

Figure 9:
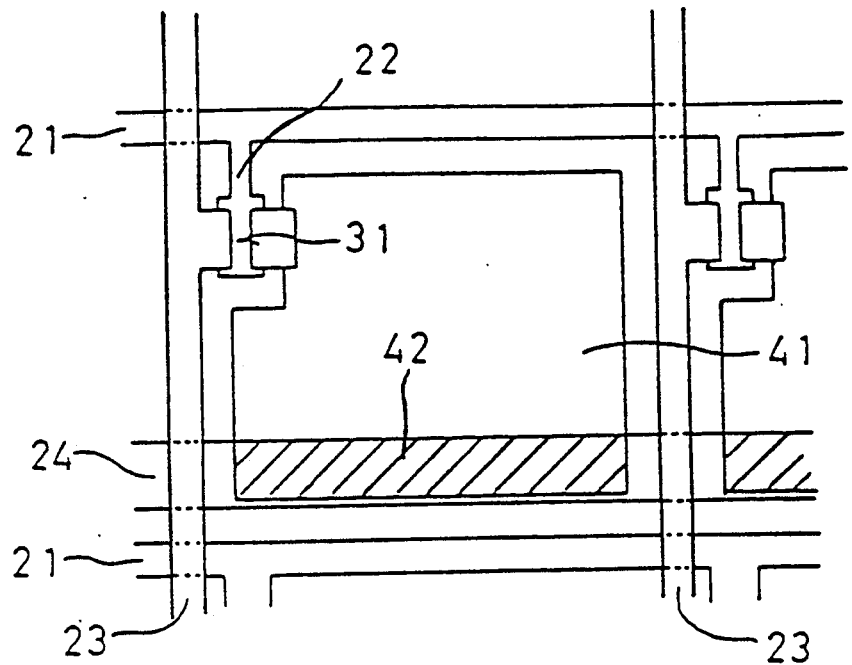
FIGS. 9 and 10 are plan views of other embodiments each having a supplemental capacitor.

The present invention may also be applied to an active matrix display device having a supplemental capacitor 42 as shown in FIG. 9. The display device of FIG. 9 is identical to the foregoing embodiment illustrated in FIG. 6, except that a supplemental capacitor 42 is provided. The supplemental capacitor 42 is formed on the superimposed portion (shaded portion) of the pixel electrode and a supplemental capacitor electrode 24 that is disposed on the substrate 1 in parallel with the gate bus line 21. In the display device of FIG. 5 also, pixel defects can be corrected in the same manner as in the foregoing embodiment illustrated in FIG. 6.

Figure 10:
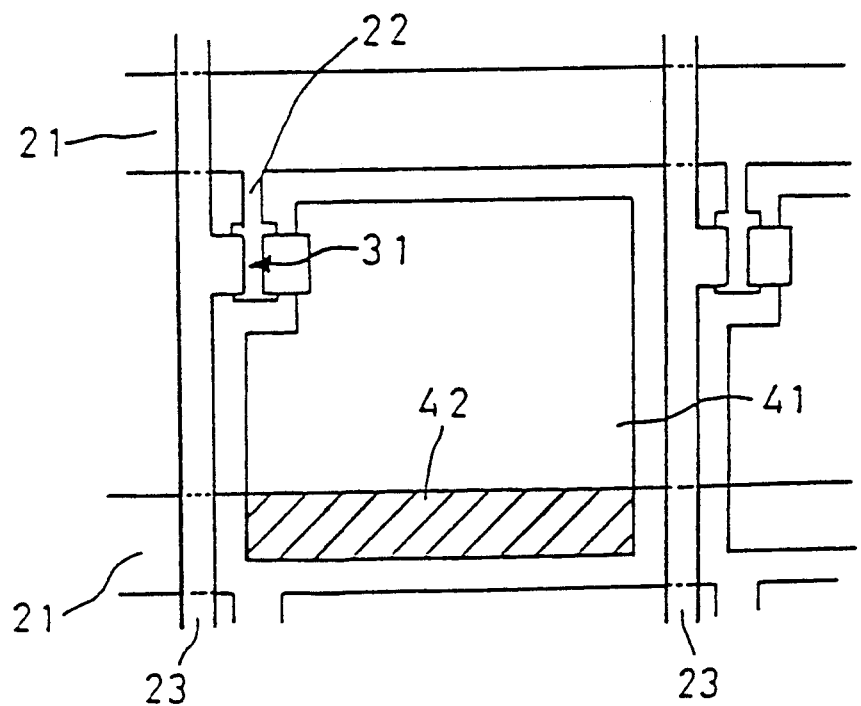

Furthermore, the present invention can be applied to an active matrix display device having a construction as shown in FIG. 10. The display device shown is so constructed as to prevent the opening area from being reduced by the provision of the supplemental capacitor 42 which is the case with the display device of FIG. 9. That is, in the display device of FIG. 10, the gate bus line 21 is enlarged in width so as to be superimposed on a portion of the pixel electrode 41. According to this construction, the adjacent gate bus line 21 which is in a non-selected condition can be used as the supplemental capacitor electrode. Further, since no gap is created between the gate bus line 21 and the supplemental capacitor electrode 24 unlike the construction of FIG. 9, the opening area is prevented from being reduced. In this display device also, pixel defects can be corrected in the same manner as in the foregoing embodiment illustrated in FIG. 6.

Any of the embodiments shown in FIGS. 1 to 10 uses a TFT as the switching element. For the embodiments of FIGS. 1 to 10, there can be used any switching element as long as the signal line side electrode and the pixel electrode side electrode thereof can be electrically interconnected by irradiating light energy such as a laser beam or the like.

Figure 11:
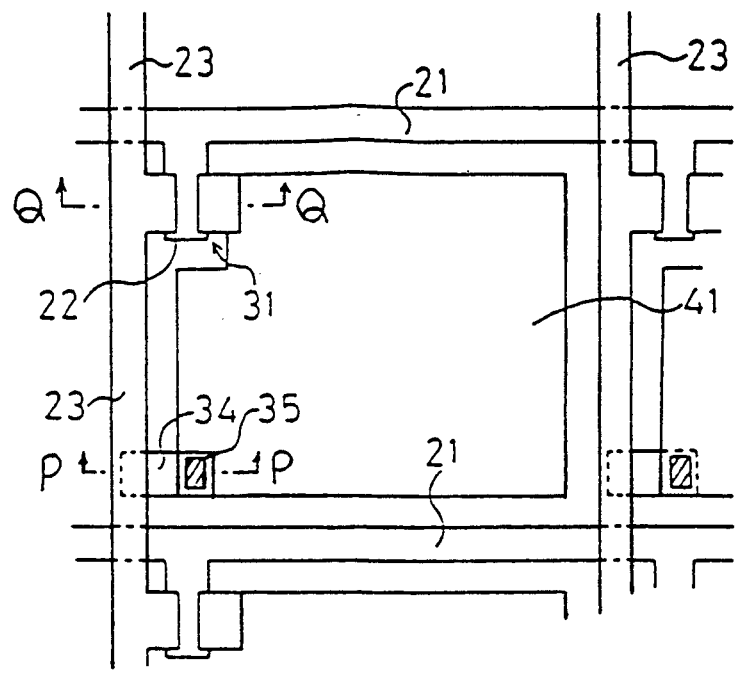
FIG. 11 is a plan view of an embodiment having a conductive layer and a conductive piece.
Figure 12A:
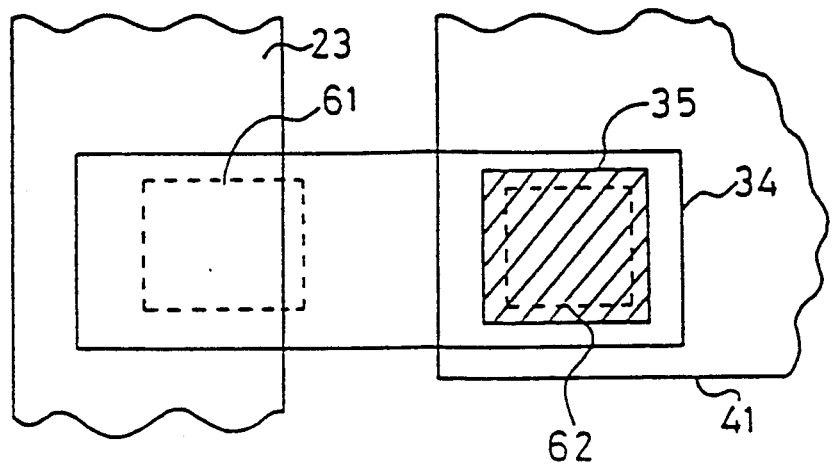
FIG. 12A is an enlarged plan view of a portion where the conductive layer of FIG. 11 is formed.
Figure 12B:
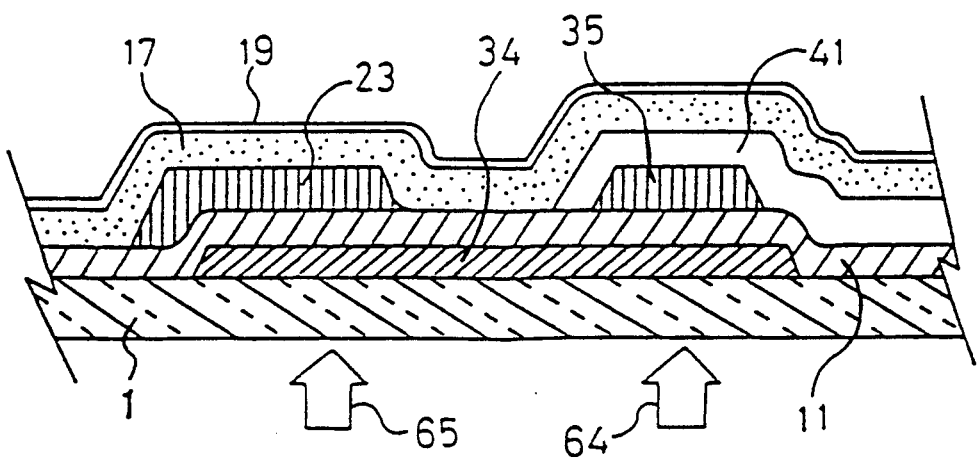
FIG. 12B is a cross sectional view taken along line P—P in FIG. 11.

FIG. 11 shows a plan view of an active matrix substrate in still another embodiment of the present invention. FIG. 12A is a view of an enlarged portion of a conductive layer 34 of FIG. 11, and FIG. 12B shows a cross sectional view taken along line P—P in FIG. 11. The cross sectional view of a display device using the substrate of FIG. 11, taken along line Q—Q in FIG. 11, is the same as shown in FIG. 3 previously described. The following describes the active matrix display device of this embodiment in the sequence of its manufacturing steps. A gate bus line 21, a gate bus branch line 22 branching from the gate bus line 21, and a conductive layer 34 are simultaneously formed on a glass substrate 1. Generally, the gate bus line 21 and the gate bus branch line 22 are formed from a single or multiple layers of such metals as Ta, Ti, Al, Cr, etc. In this embodiment, Ta is used as the material. The conductive layer 34 is formed from the same metal as used for the gate bus line 21. The gate bus line 21, the gate bus branch line 22, and the conductive layer 34 are formed by patterning the Ta metal layer which is formed by sputtering. A base coat film formed from $Ta_2O_5$ or the like may be formed on the glass substrate 1 prior to the formation of the gate bus line 21, the gate bus branch line 22, and the conductive layer 34.

A base insulating film 11 made of $SiN_x$ is formed over the entire surface covering the gate bus line 21, the gate bus branch line 22, and the conductive layer 34. The gate insulating film 11 is deposited to a thickness of 3000 Å using the plasma CVD technique.

Next, a TFT 31 is formed on an end portion of the gate bus branch line 22 with a portion of the gate bus branch line 22 functioning as the gate electrode 25 of the TFT 31. After forming the gate insulating film 11 as describe above, a-Si layer which is later formed as a channel layer 12 and an $SiN_x$ layer which is later formed as an etching stopper layer 13 are deposited. The thickness of the a-Si layer is 300 Å, and that of the $SiN_x$ layer is 2000 Å. Next, the $SiN_x$ layer is patterned to form the etching stopper layer 13. Furthermore, over the entire surfaces of the a-Si layer and the etching stopper layer 13, an $n^+$-a-Si layer doped with P (phosphorus) which is later formed as contact layers 14 and 14 is deposited to a thickness of 800 Å using the plasma CVD technique. After that, the a-Si layer and the $n^+$-a-Si layer are simultaneously patterned to form the channel layer 12 and the contact layers 14 and 14.

Next, a Ti metal layer is formed which is later formed as a source electrode 32, a source bus line 23 to function as a signal line, a drain electrode 33, and a conductive piece 35. Generally, the source bus line 23 and others are formed from a single or multiple layer of such metals as Ti, Al, Mo, Cr, etc. In this embodiment, Ti is used as the material. The Ti metal layer is deposited by using a sputtering technique. The Ti metal layer is patterned to form the source electrode 32, the source bus line 23, the drain electrode 33, and the conductive piece 35. The source bus line 23 and the gate bus line 21 intersect each other with the gate insulating film 11 interposed therebetween. As shown in FIG. 12B, the source bus line 23 is formed so as to be superimposed on an end portion of the conductive layer 34 with the gate insulating film 11 interposed therebetween. Above the other end portion of the conductive layer 34 on which the source bus line 23 is not superimposed, the conductive piece 35 is formed with the gate insulating film 11 interposed therebetween.

Next, a pixel electrode 41 made of ITO (indium tin oxide) is formed in a rectangular area surrounded by the gate bus line 21 and the source bus line 23, as shown in FIG. 11. The pixel electrode 41 is superimposed on an end portion of the drain electrode 33 of the TFT 31 for electrical connection to the drain electrode 33. The pixel electrode 41 is also formed so as to be superimposed on the conductive piece 35, as shown in FIG. 12B.

Further, over the entire surface of the substrate on which the pixel electrode 41 are formed, a protective film 17 made of $SiN_x$ is deposited. The protective film 17 may be formed in the shape of a window opened above the central portion of the pixel electrode 41. An orientation film 19 is formed over the protective film 17. On a glass substrate 2 disposed opposite to the glass substrate 1, there are formed a counter electrode 3 and an orientation film 9. A liquid crystal layer 18 is charged between the substrates 1 and 2 to complete the active matrix display device of the present invention.

In the active matrix display device of the above construction, when the TFT 31 becomes defective or when a weak leakage current flows between the source bus line 23 and the pixel electrode 41, a pixel defect occurs. If this happens, correction is made in the following manner. First, light energy is irradiated onto a superimposed region 61 of the source bus line 23 and the conductive layer 34, the region being indicated by a broken line in FIG. 12A (a portion indicated by an arrow 65 in FIG. 12B), and also onto a superimposing region 62 of the conductive layer 34 and the conductive piece 35 (a portion indicated by an arrow 64 in FIG. 12B). As a result, the source bus line 23, the conductive layer 34, and the conductive piece 35 are electrically interconnected. Since the conductive piece 35 is electrically connected to the pixel electrode 41, the pixel electrode 41 is now connected electrically to the source bus line 23. In this embodiment also, a YAG laser beam (wave length:1064 nm) is used as the light energy. The laser beam may irradiate either through the substrate 1 or through the substrate 2 (FIG. 3). When a light shield film is formed on the substrate 2, which is often the case, the laser beam irradiates through the substrate 1. In this embodiment also, the laser beam irradiates through the substrate 1.

Since the signal from the source bus line 23 is applied at all times to the pixel electrode 41 (corrected pixel electrode) via the conductive layer 34, the corrected pixel electrode is unable to function properly. However, since the pixel driven by the corrected pixel electrode performs a display corresponding to the root-mean-square value of the signal applied to the source bus line 23, the pixel does not appear as a complete bright spot or black spot but performs a display having the average brightness of the pixels arrayed along the source bus line 23. Thus, the pixel defect is made extremely difficult to discern.

Even if the laser beam is irradiated as described above, since the protective film 17 is formed over the superimposing area of the conductive layer 34 and the source bus line 23 as well as over the superposed area of the conductive layer 34 and the conductive piece 35, molten metals or other foreign matter are prevented from entering the display medium, i.e. the liquid crystal layer 18, and therefore, no detrimental effects are caused to the display.

Figure 13A:
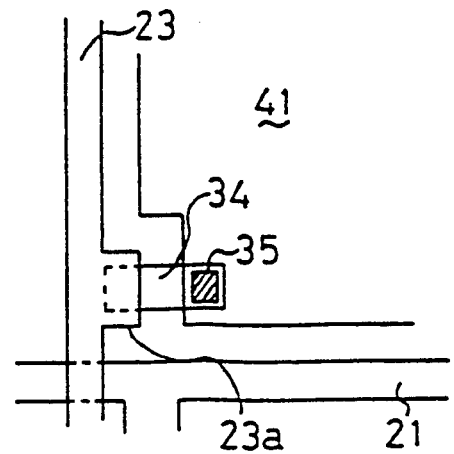
FIG. 13A to FIG. 13C, FIG. 14A and FIG. 14B, and FIG. 15 are plan views of other embodiments each having a conductive layer and a conductive piece.
Figure 13B:
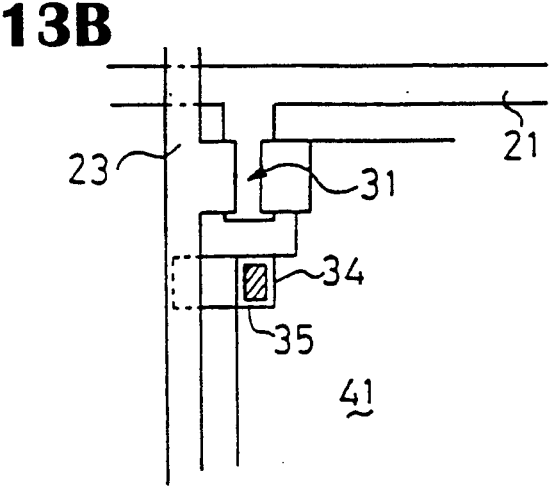
Figure 13C:
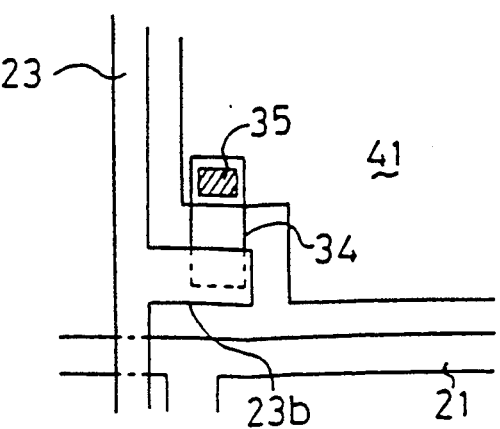

FIG. 13A to FIG. 13C show other embodiments of active matrix substrates each used in the display device of the present invention. In the substrate of FIG. 13A, the source bus line 23 is provided with a projection 23a which is superimposed on the conductive layer 34. Other construction including the conductive piece 35, etc. is the same as that of FIG. 11.

In the embodiment illustrated in FIG. 11, the conductive layer 34 and the conductive piece 35 are disposed spaced apart from the TFT 31, but may be disposed at any position as long as they are positioned adjacent to the source bus line 23. FIG. 13B shows an example in which the conductive layer 34 is formed adjacent to the TFT 31.

In the embodiment shown in FIG. 13C, a source bus branch line 23b is formed which branches from the source bus line 23. The conductive layer 34 is formed in parallel with the source bus line 23 and the source bus branch line 23b is superimposed on the conductive layer 34.

In a display device using any of the substrates of FIG. 13A to FIG. 13C, pixel defects are corrected in the same manner as in the foregoing embodiment illustrated in FIG. 11. Although not shown, it is also possible to employ a construction in which the conductive layer 34, the conductive piece 35, etc. are disposed at the side of the source bus line 23 disposed opposite to the source bus line 23 shown in FIG. 13A to FIG. 13C across the pixel electrode 41.

Figure 14A:
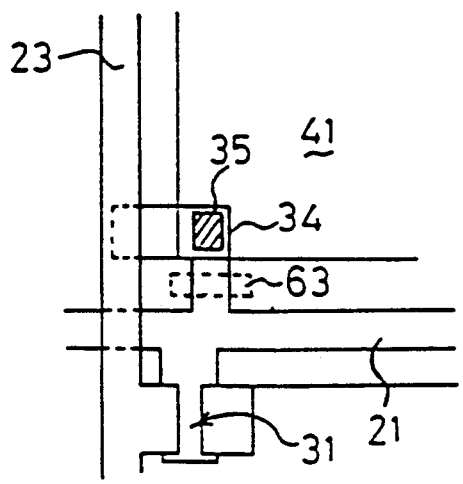
Figure 14B:
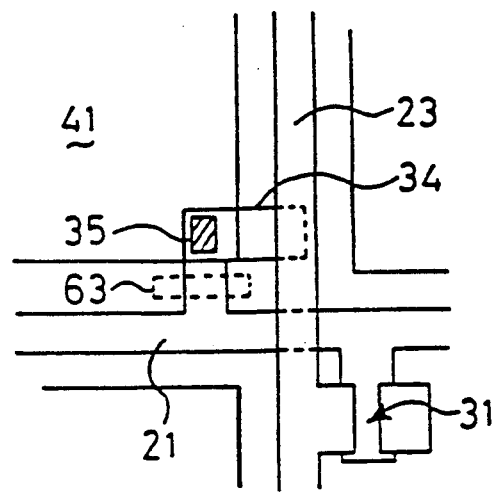

FIG. 14A and FIG. 14B show other embodiments of active matrix substrates each used in the display device of the present invention. In the active matrix substrates illustrated in FIG. 11 and FIG. 13A to FIG. 13C, since only the gate insulating film 11 is provided between the conductive layer 34 and the source bus line 23, spontaneous shorts may occur between the source bus line 23 and the conductive layer 34 and between the conductive layer 34 and the conductive piece 35. The active matrix substrates shown in FIG. 14A and FIG. 14B are designed to eliminate this problem. The conductive layer 34 on the substrate of FIG. 14A is formed in such a way as to be connected to the gate bus line 21 disposed adjacent to the gate bus line connected to the pixel electrode 41 which is superimposed on the conductive layer 34. In many cases, an anodic oxide film is formed on the gate bus line 21 to ensure the insulation thereof. When the conductive layer 34 is formed in such a way as to be connected to the gate bus line 21, as in these embodiments, an anodic oxide film can also be formed on the conductive layer 34. When an anodic oxide film is formed on the conductive layer 34, it serves to prevent shorts between the source bus line 23 and the conductive layer 34 and between the conductive layer 34 and the conductive piece 35.

In the substrate of FIG. 14B, the conductive layer 34 and the conductive piece 35 are disposed in a corner opposite to the corner in which the TFT 31 is formed. Therefore, in this embodiment, the conductive layer 34 is superimposed by the source bus line 23 disposed adjacent to the source bus line connected to the pixel electrode which is superimposed on the conductive layer 34.

When a pixel defect has occurred in the display device using any of the substrates of FIG. 14A and FIG. 14B, connections are made between the conductive layer 34 and the source bus line 23 and between the conductive layer 34 and the conductive piece 35, in the same manner as in the foregoing embodiment illustrated in FIG. 11. Further, in these substrates, light energy is irradiated onto an area 63 indicated by broken lines in FIG. 14A and FIG. 14B, to cut off the connection between the conductive layer 34 and the gate bus line 21. As a result of the above connections and cutting by irradiation with light energy, the pixel electrode 41 is directly connected to the source bus line 23. When the above correction has been made, on the substrate of FIG. 14A, the pixel electrode 41 becomes directly connected to the source bus line 23 to which it was connected via the TFT 31, as in the case of the substrate of FIG. 11, but on the substrate of FIG. 14A, the pixel electrode 41 becomes connected to the source bus line disposed adjacent to the source bus line 23 to which it was connected via the TFT 31.

Figure 15:
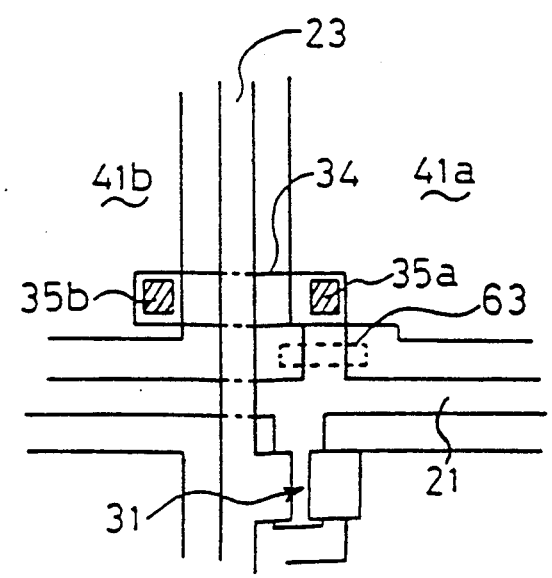

FIG. 15 shows another embodiment of an active matrix substrate used in the display device of the present invention. In this embodiment, the conductive layer 34 is formed below two adjacent pixel electrodes 41a, 41b and the source bus line 23. In this embodiment, a single conductive layer 34 is provided for each pair of pixel electrodes. Conductive pieces 35a and 35b are formed on the respective end portions of the conductive layer 34 with the gate insulating film 11 interposed therebetween. The pixel electrodes 41a and 41b are superimposed directly on the conductive pieces 35a and 35b, respectively. Also, the conductive layer 34 is formed in such a way as to be connected electrically to the gate bus line 21 disposed adjacent to the gate bus line connected to the pixel electrodes 41a and 41b superimposed on the conductive layer 34. Since the conductive layer 34 is formed in such a way as to be connected to the gate bus line 21, an anodic oxide film can be formed on the conductive layer 34.

When a defect has occurred to the pixel electrode 41a or 41b in the display device using the substrate of FIG. 15, a laser beam is irradiated first onto the superimposed portion of the source bus line 23 and the conductive layer 34. Then, the laser beam is irradiated onto the superimposed portion of the conductive layer 34 and the conductive piece 35a in the case of a defect in the pixel electrode 41a, and onto the superimposing portion of the conductive layer 34 and the conductive piece 35b in the case of a defect in the pixel electrode 41b. Furthermore, the laser beam is irradiated onto an area 63 indicated by a broken line in FIG. 15, to cut off the electrical connection between the conductive layer 34 and the gate bus line 21. As a result of the above correction, the defective pixel electrode 41a or 41b is directly connected to the source bus line 23.

When both pixel electrodes 41a and 41b are defective simultaneously, both pixel electrodes 41a and 41b are directly connected to the source bus line 23 to correct the respective defects. In the construction of this embodiment, the conductive layer 34 is connected to the gate bus line 21, but it may be so constructed that the conductive layer 34 is not connected to the gate bus line 21.

Figure 16:
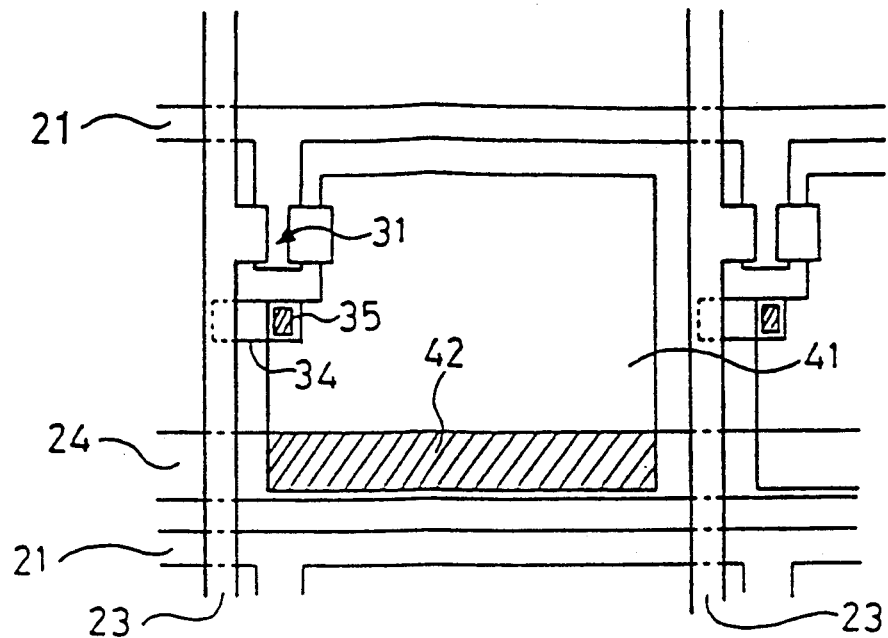
FIGS. 16 to 19 are plan views of other embodiments of the present invention each having a supplemental capacitor.
Figure 18:
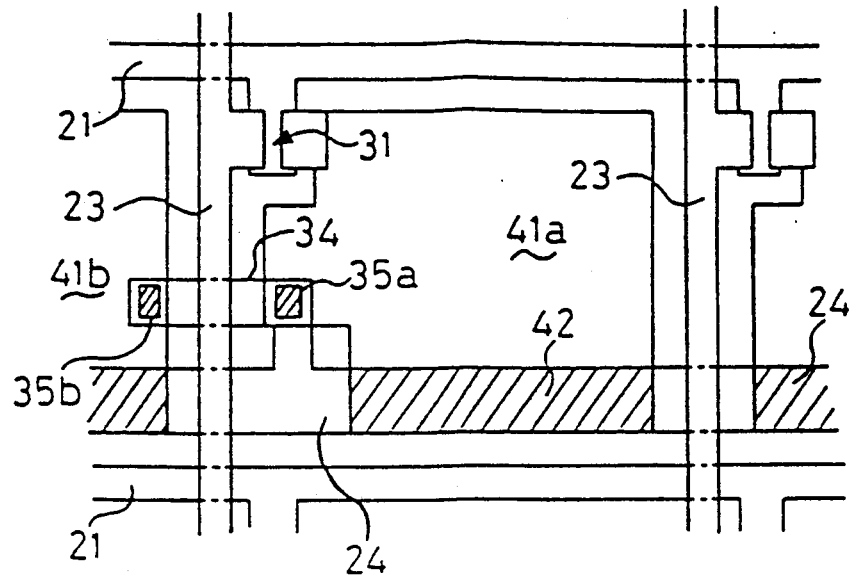

The construction of the present invention may also be applied to an active matrix display device having a supplemental capacitor as shown in FIG. 16. The display device of FIG. 16 is identical to the foregoing embodiment illustrated in FIG. 13B, except that the supplemental capacitor 42 is provided. The supplemental capacitor 42 is formed on the superimposed area of the pixel electrode 41 and a supplemental capacitor electrode 24 which is disposed on the substrate 1 in parallel with the gate bus line 21. In the display device of FIG. 16, pixel defects can also be corrected in the same manner as in the foregoing embodiment illustrated in FIG. 11. The conductive layer 34, the conductive piece 35, and the source bus line 23 may also be constructed such as shown in FIG. 11, FIG. 13A, and FIG. 13C. Furthermore, the conductive layer 34 and the conductive piece 35 shown in FIG. 16 may also be constructed such as shown in FIG. 14A, FIG. 14B, and FIG. 15. When the conductive layer 34 and the conductive piece 35 are constructed such as shown in these figures, the conductive layer 34 is electrically connected to the supplemental capacitor electrode 24, not to the gate bus line 21. As an example, a substrate is shown in FIG. 18 in which the conductive layer 34 and the conductive piece 35 are constructed such as shown in FIG. 15. In the active matrix substrate shown in FIG. 18, the conductive layer 34 is formed in such a way as to be connected to the supplemental capacitor electrode 24. In many cases, an anodic oxide film is also formed on the supplemental capacitor electrode 24. Therefore, with the conductive layer 34 connected to the supplemental capacitor electrode 24, it is possible to form an anodic oxide film also on the conductive layer 34.

Figure 17:
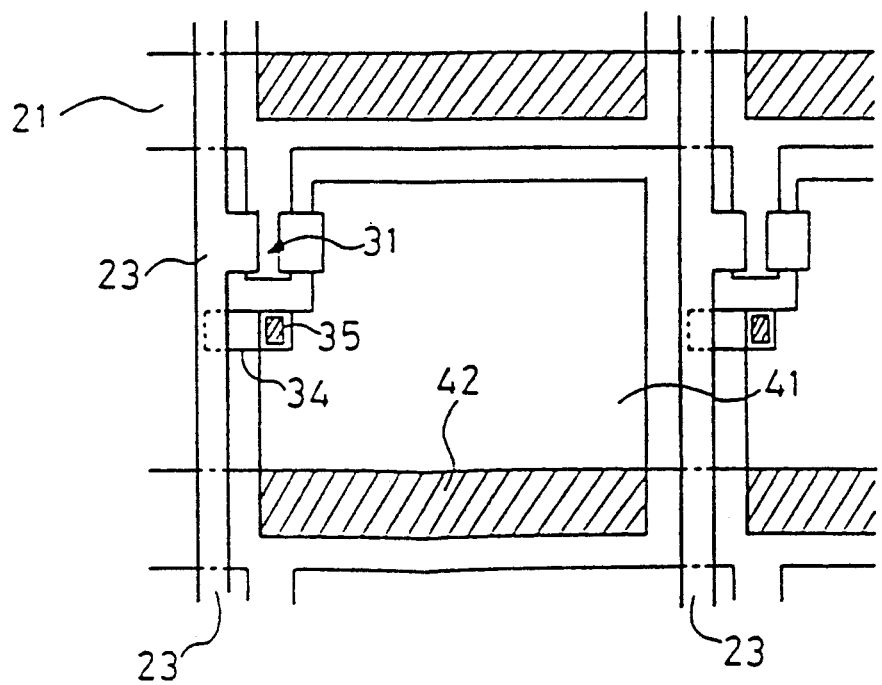
Figure 19:
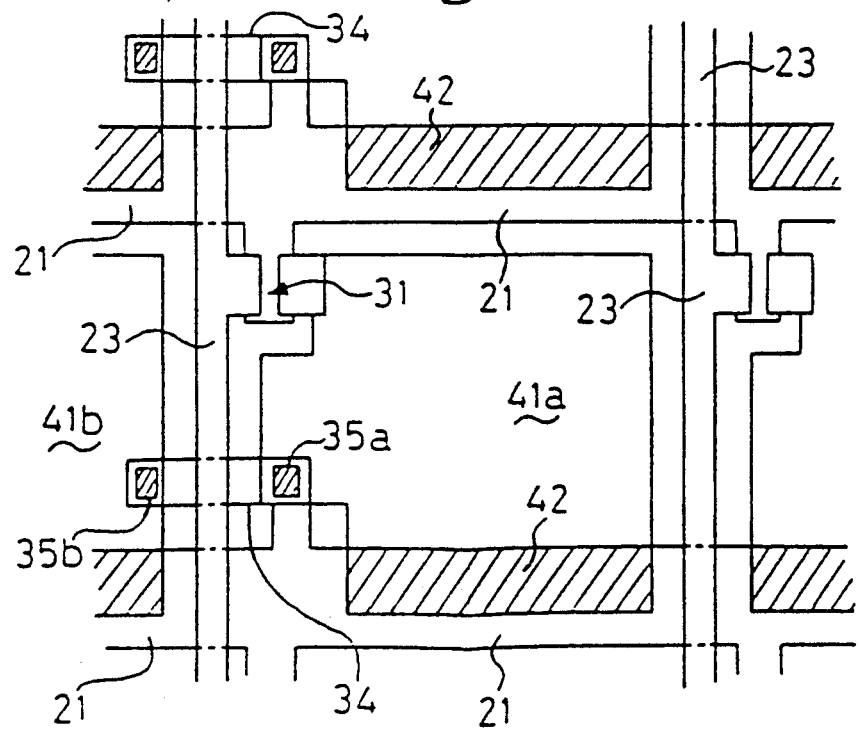
Figure 20:
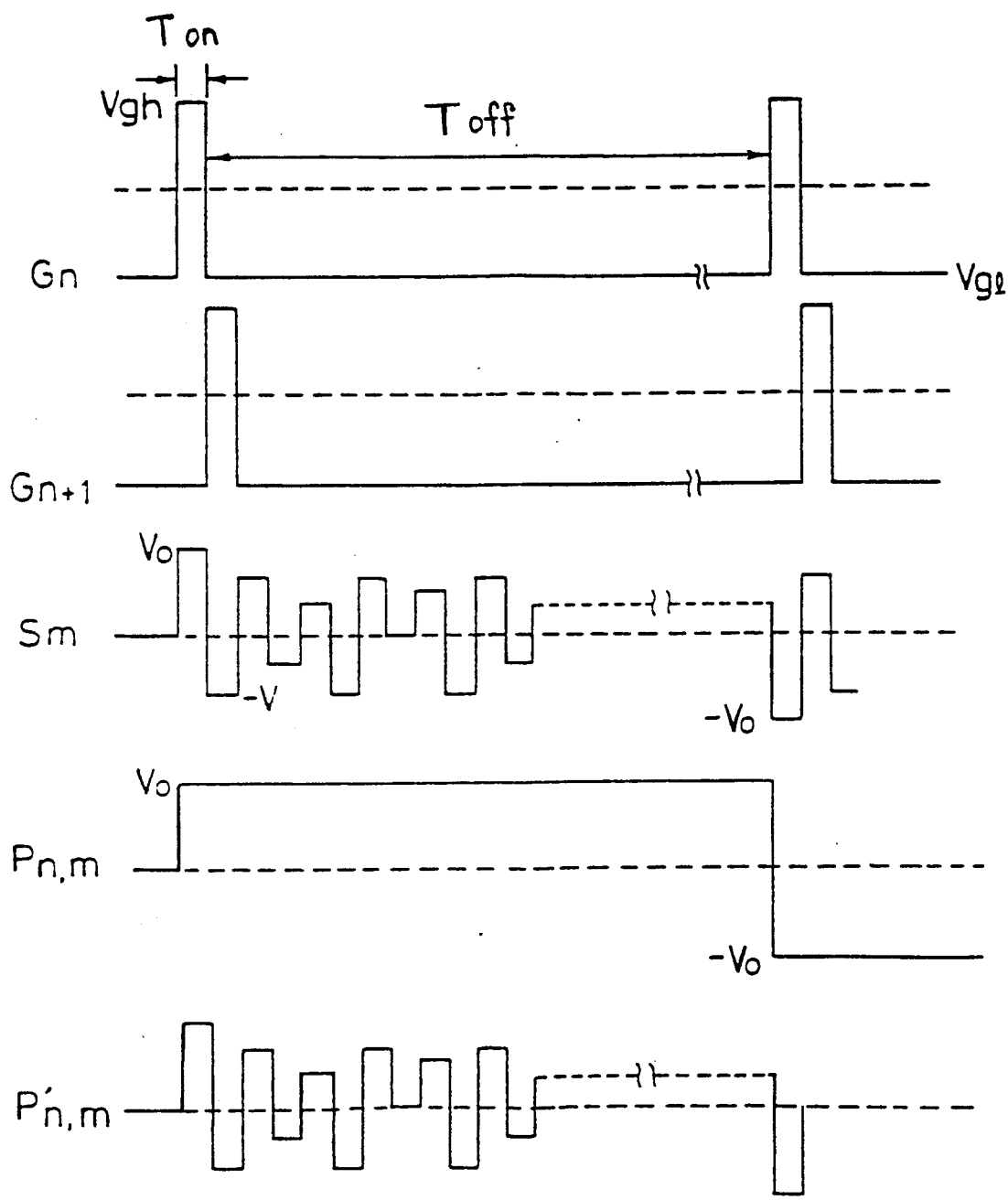
FIG. 20 is a diagram showing the relationship of the signal applied to a scanning line and a signal line with respect to the voltage applied to a pixel electrode.

Further, the present invention can be applied to an active matrix display device having a supplemental capacitor 42 as shown in FIG. 17. The display device shown is designed so that the opening area is prevented from being reduced by the provision of the supplemental capacitor 42 which is the case with the display device of FIG. 16. That is, in the display device of FIG. 17, the gate bus line 21 is enlarged in width so that the pixel electrode 41 is superimposed on the gate bus line 21. According to this construction, the adjacent gate bus line 21 which is in a nonselected condition can be used as the supplemental capacitor electrode. Furthermore, since no gap is created between the gate bus line 21 and the supplemental capacitor electrode 24 unlike the construction of FIG. 16, the opening area can be prevented from being reduced. In this display device also, pixel defects are corrected in the same manner as in the foregoing embodiment illustrated in FIG. 11. In the embodiment of FIG. 17 also, the conductive layer 34, the conductive piece 35, and the source bus line 23 may be constructed such as shown in FIG. 11, FIG. 13A, and FIG. 13C. Further, the conductive layer 34 and the conductive piece 35 in FIG. 17 may also be constructed such as shown in FIG. 14A, FIG. 14B, and FIG. 15. As an example, a substrate is shown in FIG. 19 in which the conductive layer 34 and the conductive piece 35 in FIG. 17 are constructed such as shown in FIG. 15.

In any of the above embodiments, the TFT 31 shown has a gate electrode in the lower portion and a source electrode and a drain electrode in the upper portion, but alternatively, a TFT having a gate electrode in the upper portion and a source electrode and a drain electrode in the lower portion can be used. Also, in the embodiments of FIGS. 11 to 19, the TFT 31 is formed on the gate bus branch line 22, but alternatively, the TFT 31 may be formed on the gate bus line 21 with the source electrode thereof connected to the branch line branching from the source bus line 23.

Furthermore, any of the embodiments shown in FIGS. 11 to 19 uses a TFT as the switching element, but devices other than TFTs, such as MIM elements, MOS transistors, diodes, varistors, etc. may also be used.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix display device comprising:
 a pair of insulating substrates at least one of which is light transmitting;
 scanning lines and signal lines arranged orthogonally on one of said pair of substrates; and
 pixel electrodes each connected to an adjacent scanning line and an adjacent signal line via a switching element,
 a conductive layer disposed under said adjacent signal line and said pixel electrode and extending therebetween;
 an insulating film interposed between said conductive layer and said adjacent signal line, and between said conductive layer and said pixel electrode, respectively; and
 a conductive piece formed between said pixel electrode and said insulating film and overlapping said conductive layer for facilitating a conductive connection between said conductive layer and said pixel electrode, said conductive layer facilitating another conductive connection between said conductive layer and said adjacent signal line under a defective condition of said switching element.

2. An active matrix display device comprising: a pair of insulating substrates at least one of which is light transmitting; scanning lines and signal lines arranged respectively orthogonally on one of said pair of substrates; and pixel electrodes each connected to an adjacent scanning line and an adjacent signal via a switching element, a conductive layer disposed under said adjacent signal line and said pixel electrode and extending therebetween; an insulating film interposed between said conductive layer and said adjacent signal line, and between said conductive layer and said pixel electrode, respectively; and a conductive piece formed between said pixel electrode and said insulating film and overlapping said conductive layer for facilitating a conductive connection between said conductive layer and said pixel electrode, wherein said conductive layer is conductively connected to a scanning line adjacent to said scanning line connected to said pixel electrode and an anodic oxide film is formed on said conductive layer.

3. An active matrix display device comprising: a pair of insulating substrates at least one of which is light transmitting; scanning lines and signal lines arranged respectively orthogonally on one of said pair of substrates; and pixel electrodes each connected to an adjacent scanning line and an adjacent signal line via a switching element, a conductive layer disposed under said adjacent signal line and said pixel electrode and extending therebetween; an insulating film interposed between said conductive layer and said adjacent signal line, and between said conductive layer and said pixel electrode, respectively; and a conductive piece formed between said pixel electrode and said insulating film and overlapping said conductive layer for facilitating a conductive connection between said conductive layer and said pixel electrode, and further comprising a supplemental capacitor electrode disposed opposite to said pixel electrode with said insulating film interposed therebetween, wherein said conductive layer is conductively connected to said supplemental capacitor electrode and an anodic oxide film is formed on said conductive layer.

4. A method of manufacturing an active matrix display device, comprising the steps of: forming an active matrix substrate which comprises an insulating substrate, scanning lines and signal lines arranged in vertical and horizontal directions on said substrate, scanning branch lines each branching from said scanning line, switching elements each formed on an end portion of said scanning branch line, and pixel electrodes each connected to said switching element, the distance between the scanning line side of said switching element and said scanning line being so provided as to allow said scanning branch line to be cut off by irradiation with light energy;

attaching an opposing substrate to said active matrix substrate with a display medium sandwiched between said active matrix substrate and said opposing substrate;

detecting a pixel defect by observing the brightness at every pixel under the condition that a driving voltage is applied to said pixel electrodes from said scanning lines and said signal lines via said switching elements; and irradiating light energy onto the switching element connected to a defective pixel electrode causing said pixel defect to conductively connect said defective pixel electrode to said signal line, and irradiating light energy onto said scanning branch line to disconnect said scanning branch line from said scanning line.

5. A method of manufacturing an active matrix display device, comprising the steps of:

forming an active matrix substrate which comprises an insulating substrate, scanning lines and signal lines arranged in vertical and horizontal directions on said substrate, pixel electrode each connected to said scanning line and said signal line via a switching element, conductive layers each disposed under said signal lines and said pixel electrodes with an insulating film interposed therebetween, and conductive pieces each formed between said pixel electrode and said insulating film;

attaching an opposing substrate to said active matrix substrate with a display medium sandwiched between said active matrix substrate and said opposing substrate;

detecting a pixel defect by observing the brightness at every pixel under the condition that a driving voltage is applied to said pixel electrodes from said scanning lines and said signal lines via said switching elements; and irradiating light energy onto the superimposed portion of said conductive layer and said conductive piece connected to a defective pixel electrode causing said pixel defect to conductively connect said defective pixel electrode to said conductive layer, and irradiating light energy onto the superimposed portion of said signal line and said conductive layer to conductively connect said signal line to said conductive layer.

6. An active matrix display device comprising: a pair of insulating substrates at least one of which is light transmitting; scanning lines and signal lines arranged orthogonally on one of said pair of substrates; and pixel electrodes each connected to an adjacent scanning line and an adjacent signal via a switching element, a conductive layer disposed under said adjacent signal line and extending between a pair of adjacent pixel electrodes and connected to a scanning line adjacent to said scanning line connected to said pixel electrodes; an insulating film interposed between said conductive layer and said adjacent signal line, and between said conductive layer and said pixel electrodes, respectively; and conductive pieces each formed between said insulating film and one of said pair of pixel electrodes and overlapping said conductive layer for facilitating conductive connections between said conductive layer and said pixel electrodes and between said conductive layer and said adjacent signal line.

7. An active matrix display device comprising: a pair of insulating substrates at least one of which is light transmitting; scanning lines and signal lines arranged orthogonally on one of said pair of substrates; and pixel electrodes each connected to an adjacent scanning line and an adjacent signal line via a switching element, a conductive layer disposed under said adjacent signal line and extending between a pair of adjacent pixel electrodes; an insulating film interposed between said conductive layer and said adjacent signal line, and between said conductive layer and said pixel electrodes, respectively; and conductive pieces each formed between said insulating film and one of said pair of pixel electrode and overlapping said conductive layer for facilitating conductive connections between said conductive layer and said pixel electrode, and wherein said conductive layer is conductively connected to a scanning line adjacent to said scanning line connected to said pixel electrode and an anodic oxide film is formed on said conductive layer.

8. An active matrix display device comprising: a pair of insulating substrates at least one of which is light transmitting; scanning lines and signal lines arranged orthogonally on one of said pair of substrates; and pixel electrodes each connected to an adjacent scanning line and an adjacent signal line via a switching element, a conductive layer disposed under said adjacent signal line and extending between a pair of adjacent pixel electrodes; an insulating film interposed between said conductive layer and said adjacent signal line, and between said conductive layer and said pixel electrodes, respectively; and conductive pieces each formed between said insulating film and one of said pair of pixel electrodes and overlapping said conductive layer for facilitating conductive connections between said conductive layer and said pixel electrodes, and further comprising a supplemental capacitor electrode disposed opposite to said pixel electrode with said insulating film interposed therebetween, wherein said conductive layer is conductively connected to said supplemental capacitor electrode and an anodic oxide film is formed on said conductive layer.

* * * * *

UNITED STATES PATENT AND TRADEMARK OFFICE
CERTIFICATE OF CORRECTION

PATENT NO. : 5,335,102
DATED : August 2, 1994
INVENTOR(S) : Yuzuru Kanemori et al It is certified that error appears in the above-indentified patent and that said Letters Patent is hereby corrected as shown below:

ON THE TITLE PAGE:

Item [75] Inventors:

The address of the inventor Kiyoshi Nakazawa should read -- Fujiidera --.

Column 18, line 50 (claim 6, line 6), -- line -- should be inserted after "signal".

Signed and Sealed this

First Day of November, 1994

*Attest:*

BRUCE LEHMAN

*Attesting Officer*  *Commissioner of Patents and Trademarks*